Sept. 9, 1924.  
R. N. CONWELL  
1,508,361

ELECTRICAL METHOD AND APPARATUS

Filed May 11, 1921

Inventor:
Rollin N. Conwell,
Delos By G. Haynes
Attorney.

Patented Sept. 9, 1924.

1,508,361

UNITED STATES PATENT OFFICE.

ROLLIN N. CONWELL, OF BLOOMFIELD, NEW JERSEY.

ELECTRICAL METHOD AND APPARATUS.

Application filed May 11, 1921. Serial No. 468,586.

*To all whom it may concern:*

Be it known that I, ROLLIN N. CONWELL, a citizen of the United States, and a resident of Bloomfield, county of Essex, State of New Jersey, have invented an Improvement in Electrical Methods and Apparatus, of which the following is a specification.

This invention relates to electrical methods and apparatus, and with regard to certain more specific features, to methods and apparatus for use in connection with alternating-currents.

Among the several objects of the invention may be noted the provision of inexpensive and durable electrical apparatus for effecting the various results hereinafter indicated, utilizing inductive action; and the provision of simple and reliable methods of attaining such results. Other objects will be in part obvious and in part pointed out hereinafter.

The invention accordingly comprises the features of construction, steps and sequence of steps, combinations of elements and arrangements of parts, which are exemplified in the description hereinafter in connection with the accompanying drawings, and the scope of the application of which will be indicated in the following claims.

Figure 1:
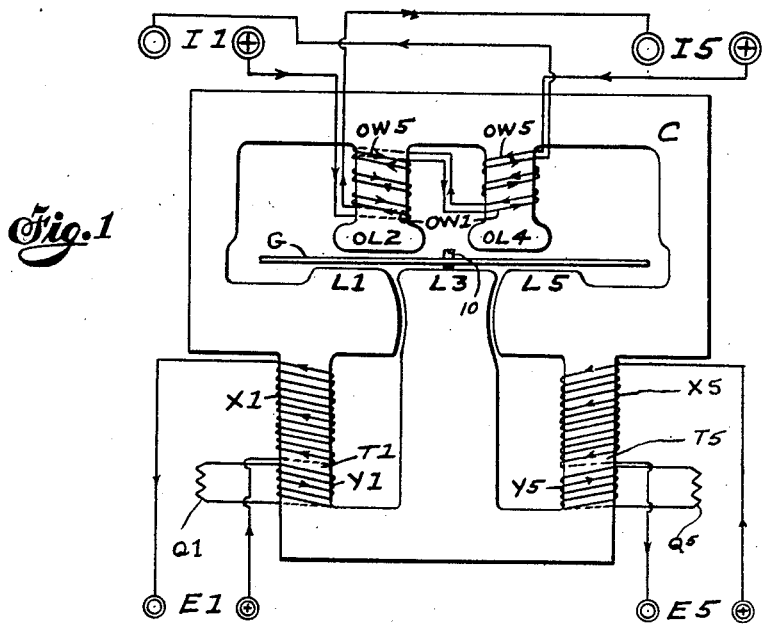
Figure 2:
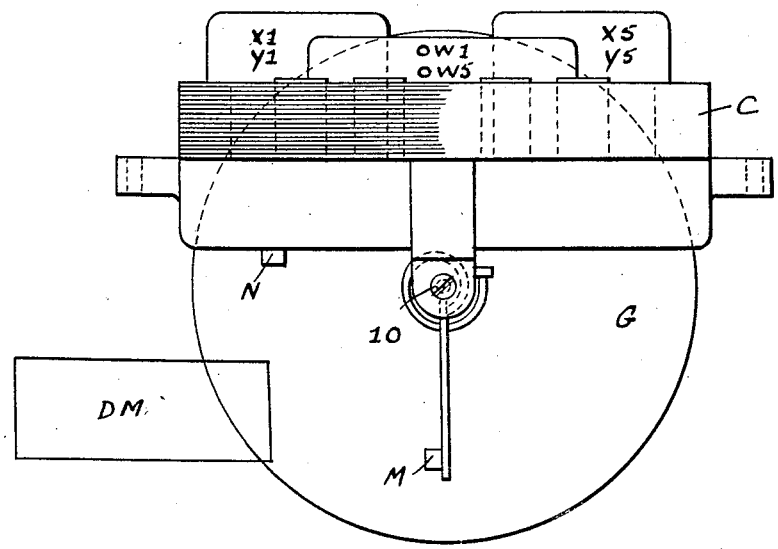

In the accompanying drawings, in which is illustrated diagrammatically one of various possible embodiments of the invention, Fig. 1 is an elevation of one form of apparatus; and Fig. 2 is a plan of the parts shown in Fig. 1, excluding the connections.

Similar reference characters indicate corresponding parts throughout both views of the drawings.

FIG. 1.

*Construction.*

Referring now more particularly to Fig. 1, there are illustrated at E1, E5, two sources of alternating current, in this instance obtained from voltage factors of two circuits; an induction device such as the transformer T1, T5 for each of said respective sources; a primary winding X1, X5 for each of said respective transformers; a leg or pole piece or core element L1, L5 for each of said respective transformers; and a secondary winding Y1, Y5 for each of said respective transformers.

The transformer fluxes are due to the magneto-motive forces of the ampere turns of the primary and secondary windings of the respective transformers.

Another flux is induced by current passing through two other windings OW1, OW5 connected to two sources I1, I5, in this instance derived from current factors of the same or different phases of the circuits from which the voltage factors above noted are respectively derived. These two other windings are each wound upon two legs OL2, OL4 in such manner that their magneto-motive forces normally oppose one another. The net flux, if other than zero, cooperates with the transformer fluxes. These several fluxes induce electric currents in one or more conductors, for some useful purpose. In the present embodiment of the invention (see Figs. 1 and 2) the conductor is a movable element, to wit, a disc G pivoted as at 10 to one side of the plane of the laminated core C. The disc is driven by the vectorial sum of the forces acting upon it, that is, the resultant force arising from the reaction of the resultant flux and the flux caused by the electric currents induced thereby in the driven element G. The driven element G may simply allow an observer to determine its position and (or) direction of movement, as in synchronizers. Or the driven element may deliver mechanical power for power purposes, or run a totalizer or operate a pointer or recording device (stylus or the like) or contacts or the like.

In the present instance the apparatus is illustrated as a relay, and the disc G is normally stationary. Upon any departure from normal condition, the disc tends to rotate in one direction or the other, retarded if desired by one or more drag magnets DM (Fig. 2) and the torque developed is determined by the magnitude of the abnormality that causes the torque. Such torque may be used for any of the several purposes above named, for which such torque may be suitable.

Normal condition.

In tracing the several currents and fluxes during normal condition, assume the sources E1, E5 in phase and sources I2, I5 in phase, and the ampere turns in the two primaries equal, and assume an instant when the right-hand conductor at each source of power is plus, as indicated in Fig. 1. At this time, current in primary X1 flows to the left on the front side of the winding, inducing in secondary Y1 a current flowing to the right on the front side of the latter winding. The latter current flows through a resistance Q1. Assume the current at source I1 flows to the left through the front side of the other winding OW1 on the left leg OL2, and to the right through the front side of said winding OW1 on the right leg OL4. Current in primary X5 flows to the right on the front side of the winding, inducing in secondary Y5 a current flowing to the left on the front side of the latter winding. Assume the current at source I5 to be in phase with the current at source E5. The current at I5 flows to the right through the front side of the other winding OW5 on the left leg OL2, and to the left through the front side of said winding OW5 on the right leg OL4. The proportioning of the windings and other factors is preferably such that this opposite flow of currents in the other windings OW1, OW5 produces normally zero flux in the legs OL2, OL4 in quadrature with the transformer flux. As there is no traveling field acting on the disc, the disc does not rotate.

Abnormal condition I, caused by relative increase of current at source I1.

In tracing the several currents and fluxes upon a departure from normal condition, assume the currents at the sources I1, I5 in phase and the current at the source I1 larger than normal with respect to current at source I5. At this time, the directions of the several currents are the same as during normal conditions. The fluxes, however, are different. The current in the other winding OW1 is thus greater than the current in other winding OW5. The flux due to the differential action of other windings OW1, OW5 is no longer zero, but has a magnitude determined by the extent of inequality between the ampere turns in the other windings OW1, OW5. That is, the larger the difference between the currents in the other windings, the larger is the other flux; and with the current in winding OW1 the greater, the other flux has one phase relation with the transformer fluxes, while if the current in winding OW5 were the greater, the other flux would have a different phase relation with the transformer fluxes.

(A) Assume the instant when the right-hand conductor at each source of power is plus. The leg L1 at the portion adjacent the disc G is therefore zero. The leg L5 may be disregarded. The leg L3 is of opposite polarity to leg L1, and is also zero. The net flux due to the preponderance of winding OW1 over winding OW5 in this instance lags behind the transformer fluxes. The extent of lag, for the purpose of the analysis hereinafter, may be considered as nominally ninety degrees; for brevity the term quadrature is used herein as indicating any out-of-phase relationship (not necessarily ninety degrees) that will effect the respective action specified. The upper legs OL2, OL4 are thus plus and minus, respectively. At this instant, then, the legs L1, OL2, L3, OL4 are respectively zero, plus, zero, minus.

(B) Assume now an instant one-quarter cycle later. The two terminals at each source of power are now of zero potential, producing zero current in each primary X1, X5; there is thus minus polarity at leg L1 and plus at leg L3. Since the other flux lags ninety degrees behind the transformer fluxes, said other flux is now zero at the legs OL2 and OL4. At this instant, then, the legs are respectively minus, zero, plus, zero, which means that the plus polarity has traveled from leg OL2 to leg L3.

(C) Assume now an instant another one-quarter cycle later. The right-hand terminal at each source of power is now minus, and the several currents and fluxes are thus one-half cycle behind their directions and values at the initial instant, indicated in paragraph A above. The legs are thus now respectively zero, minus, zero, plus, which means that the plus polarity has traveled from leg L3 to leg OL4.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The legs are thus now respectively plus, zero, minus, zero, which means that the plus polarity has disappeared from leg OL4 and reappeared at leg L1.

(E) Assume now an instant another one-quarter cycle later, that is, an entire cycle later than the condition in paragraph A. The legs are now of the same polarity as at the instant in paragraph A, namely, respectively zero, plus, zero, minus, which means that the plus polarity has traveled from leg L1 to leg OL2.

The traveling field thus produced causes electric currents in the disc G, and the reaction between said flux or field and the flux caused by said currents produces torque in the disc, tending to rotate the disc clockwise (Fig. 2).

*Abnormal condition II, caused by relative increase of current at source I5.*

Next may be traced the several currents and fluxes when the departure from normal condition is caused by the current at the source I5 becoming larger than normal with respect to the current at source I1.

(A) Assume first the instant when the right-hand conductor at each source of power is plus. The leg L1 may be disregarded. The leg L5 is zero, so far as the transformer fluxes therein are concerned. The leg L3 is of opposite polarity to leg L5 and is also zero. The net flux to the preponderance of winding OW5 over winding OW1 may be considered as ninety degrees ahead of the transformer fluxes. At the instant in question, the leg OL2 is minus and the leg OL4 is plus. At this instant, then, the legs are respectively minus, zero, plus, zero.

(B) Assume now an instant one-quarter cycle later. The two terminals at each source of power are now of zero potential, producing zero current in each primary K1, X5; there is thus minus polarity at leg L5. Since the other flux leads the transformer fluxes by ninety degrees, said other flux is now zero at legs OL2 and OL4. At this instant, then, the legs are respectively zero, plus, zero, minus, which means that the plus polarity has traveled from leg OL4 to leg L3, or in an opposite direction to its direction of travel during the corresponding quarter-cycle A—B during abnormal condition I.

(C) Assume now an instant another one-quarter cycle later. The left-hand terminal at each source of power is now plus, and the several currents and fluxes are thus one-half cycle behind their directions and values at the initial instant A. The legs are thus now respectively plus, zero, minus, zero, which means that the plus polarity has traveled from 13g. L3 to leg OL2.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The legs are thus now repsectively plus, zero, minus, zero, which means that the plus polarity has disappeared from leg OL2 and has reappeared at leg L5.

(E) Assume now an instant another one-quarter cycle later, that is, an entire cycle later than the condition in paragraph A. The legs are now of the same polarity as at the instant in paragraph A, namely, respectively zero, minus, zero, plus, zero, which means that the plus polarity has traveled from leg L5 to leg OL4.

The disc thus tends to rotate counterclockwise (Fig. 2).

*Résumé.*

Thus an excess of current at the source of power I1 relative to the current at source I5 (abnormal condition I) causes travel of plus polarity and hence torque in one direction while a relative excess of current at the source of power I5 (abnormal condition II) causes travel of plus polarity and hence torque in the opposite direction. In the latter case, as in the former, the magnitude of said relative excess of current determines the magnitude of the torque, for the reasons above noted.

The apparatus is thus simple in construction, may be made sensitive to small departures from normal condition, and is yet rugged enough to endure severe service conditions.

*In general.*

If during normal condition, the sources of power of the relay have any acute-angle phase relation, and equal or unequal power factors, the disc is stationary while the watts on the two sides are equal; and during abnormal conditions, if the two sources of power be out of phase with one another, and (or) of unequal power factor the directions of rotation will be unchanged.

The above also applies to embodiments of the invention in apparatus other than relays, that is, any acute-angle phase relation between the currents at the sources does not cause the resultant field to travel when the watts on the two sides are equal, but does cause it to travel in one direction or the other when such watts are unequal. During the former condition, there is a flux through the poles OL2, OL4, but the phase relation of the flux with respect to the transformer flux is such that no traveling field is produced.

From the above it will be seen that the several objects of the invention are attained and other advantageous results achieved.

As many modifications of the embodiment above illustrated might be made without departing from the spirit or scope of the present invention, it is intended that the above description and accompanying drawings and claims shall be interpreted as illustrative and not in a limiting sense.

I claim:

1. In apparatus of the class described, in combination, a first means adapted to be connected to two sources of power, a magnetic circuit in which flux is produced by said first means; a second means adapted to be connected to two additional sources of power, a second magnetic circuit in which flux is produced by said second means; said second flux being substantially in quadrature with said first flux and cooperating with said first flux to produce traveling fields; and means responsive to said traveling fields.

2. In apparatus of the class described, in combination, a first means adapted to be connected to the voltage of two circuits, a magnetic circuit in which flux is produced by said first means; a second means adapted to be connected to the current of said circuits, a second magnetic circuit in which flux is produced by said second means, said second flux being substantially in quadrature with said first flux and cooperating with said first flux to produce traveling fields, and means responsive to said traveling fields.

3. In apparatus of the class described, in combination, a first means adapted to be connected to two sources of power, a magnetic circuit in which flux is produced by said first means; a second means adapted to be connected to two additional sources of power, a second magnetic circuit in which flux is produced by said second means; and a movable member; said second flux being substantially in quadrature with said first flux and cooperating with said first flux to produce traveling fields effective upon said member.

4. In apparatus of the class described, in combination, a movable member; a first means adapted to be connected to the voltage of two circuits, a magnetic circuit in which flux is produced by said first means; a second means adapted to be connected to the current of said circuits, and a second magnetic circuit in which flux is produced by said second means, said second flux being substantially in quadrature with said first flux and cooperating with said first flux to produce traveling fields effective upon said member.

5. In apparatus of the class described, in combination, a first means adapted to be connected to the voltage of two circuits, a magnetic circuit in which flux is produced by said first means; a second means adapted to be connected to the current of said two circuits, a second magnetic circuit in which flux is produced by said second means; and a movable member; said second flux being substantially in quadrature with said first flux and cooperating with said first flux to produce traveling fields adapted to tend to cause movement of said member in one direction or the other depending upon which of said two circuits is carrying the greater power.

6. In apparatus of the class described, in combination, a magnetic core member, induction devices each having a primary winning adapted to be connected to separate sources of power, short-circuited secondary windings for each of said induction devices, all of said windings being wound on said core member, and additional windings on said core member adapted to be connected to two additional sources of power, whereby the fluxes produced by said induction devices are substantially in quadrature with the fluxes produced by said additional windings, whereby traveling fields are produced; and means responsive to said traveling fields.

7. In apparatus of the class described, in combination, a magnetic core member, transformers each having a primary winding adapted to be connected to separate sources of power, short-circuited secondary windings for each of said transformers, all of said windings being wound on said core member, and additional windings on said core member adapted to be connected to two additional sources of power, whereby the fluxes produced by said transformers are substantially in quadrature with the fluxes produced by said additional windings, whereby traveling fields are produced; and a movable conductor adapted to have currents induced in it by said traveling fields.

8. In an apparatus of the class described, in combination, windings adapted to be energized from four sources of power, a movable member, means whereby the windings from one pair of sources cause fluxes having components in quadrature operative upon said member, and means whereby the windings from the other pair of sources cause fluxes having components in quadrature also operative upon said member, the net fluxes producing a traveling field tending to cause movement of said member.

9. The method of inducing currents in a conductor, which comprises producing fluxes from a voltage factor of each of a plurality of circuits, producing from a current factor of each circuit fluxes in quadrature with the first fluxes, and causing said several fluxes to combine to form traveling fields, inducing currents in said conductor.

10. The method of inducing currents in a conductor, which comprises producing coacting fluxes from a voltage factor of a plurality of circuits, producing from a current factor of each circuit coacting fluxes in quadrature with the first fluxes, and causing said several fluxes to combine to form traveling fields, inducing currents in said conductor.

11. The method of producing forces, which comprises producing fluxes from a voltage factor of each of a plurality of circuits, producing from a current factor of each circuit fluxes in quadrature with the first fluxes, causing said several fluxes to combine to form traveling fields, and inducing currents in a movable member, the reactions between fluxes caused thereby and the traveling fields tending to move said member.

12. The method of producing forces, which comprises producing coacting fluxes from the voltage of each of a plurality of circuits, producing from the current of each circuit coacting fluxes in quadrature with the first fluxes, and causing said several fluxes to combine to form traveling fields, inducing currents in a movable member, the reactions between fluxes caused thereby and the traveling fields tending to move said member.

In testimony whereof, I have signed my name to this specification this ninth day of May, 1921.

ROLLIN N. CONWELL.